(12) United States Patent
Kurota

(10) Patent No.: US 11,538,134 B2
(45) Date of Patent: Dec. 27, 2022

(54) INFORMATION GENERATION METHOD, INFORMATION GENERATION SYSTEM, AND NON-TRANSITORY COMPUTER-READABLE STORAGE MEDIUM STORING PROGRAM

(71) Applicant: SEIKO EPSON CORPORATION, Tokyo (JP)

(72) Inventor: Ippei Kurota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/471,918

(22) Filed: Sep. 10, 2021

(65) Prior Publication Data

US 2022/0076372 A1 Mar. 10, 2022

(30) Foreign Application Priority Data

Sep. 10, 2020 (JP) .............................. JP2020-151909

(51) Int. Cl.
*G06T 3/00* (2006.01)
*H04N 9/31* (2006.01)
*G06T 7/70* (2017.01)
*G06F 3/14* (2006.01)
*H04N 5/247* (2006.01)

(52) U.S. Cl.
CPC ............... *G06T 3/005* (2013.01); *G06F 3/14* (2013.01); *G06T 7/70* (2017.01); *H04N 5/247* (2013.01); *H04N 9/3185* (2013.01); *H04N 9/3194* (2013.01)

(58) Field of Classification Search
None
See application file for complete search history.

(56) References Cited

U.S. PATENT DOCUMENTS 11,120,294 B1 * 9/2021 Zalzal .................... G06T 7/521
2007/0285554 A1 * 12/2007 Givon .................... G03H 1/268
348/E13.019

FOREIGN PATENT DOCUMENTS

| JP | 2005-195939 A | 7/2005 |
|---|---|---|
| JP | 2009-005044 A | 1/2009 |
| JP | 2010-283674 A | 12/2010 |
| JP | 2015-172712 A | 10/2015 |
| JP | 2015-219679 A | 12/2015 |

* cited by examiner

Primary Examiner — Samira Monshi
(74) Attorney, Agent, or Firm — Oliff PLC

(57) ABSTRACT

An information generation method includes obtaining a first image projected on the projection target by a projector, a second image taken from a first imaging position, and a third image taken from a second imaging position, identifying a first correspondence relationship between a first coordinate system and a second coordinate system based on the first and second images, identifying a second correspondence relationship between a first coordinate system and a third coordinate system based on the first and third images, making the user designate a display area in the second coordinate system, generating transformation information for transforming the display area designated into a display area in the third coordinate system based on the first correspondence relationship and the second correspondence relationship.

11 Claims, 8 Drawing Sheets

INFORMATION GENERATION METHOD, INFORMATION GENERATION SYSTEM, AND NON-TRANSITORY COMPUTER-READABLE STORAGE MEDIUM STORING PROGRAM

The present application is based on, and claims priority from JP Application Serial Number 2020-151909, filed Sep. 10, 2020, the disclosure of which is hereby incorporated by reference herein in its entirety.

BACKGROUND

1. Technical Field

The present disclosure relates to an information generation method, an information generation system, and a non-transitory computer-readable storage medium storing a program.

2. Related Art

In projection mapping, it is common to project a projection image to a nonplanar screen from a projector. The projection image projected on the nonplanar screen appears distorted to an observer. Therefore, in the projection mapping, it is required to correct the projection image in advance taking the distortion corresponding to the shape of the screen into consideration. In JP-A-2010-283674, there is disclosed a technology of taking an image which is projected on the nonplanar screen and appears distorted using a camera, and then correcting the projection image based on the image taken by the camera. As an example of the nonplanar screen in the projection mapping, there can be cited a projection target having a three-dimensional shape. The projection image to be projected on the projection target having the three-dimensional shape includes a projection object to be projected on the projection target, and it is conceivable to use the taken image of the projection target for setting a display area to be an arrangement destination of the projection object in the projection image.

Depending on the shape of the projection target, a trouble occurs in the setting of the display area using the taken image in some cases. For example, when a part of the projection target fails to show up in the taken image such as when the projection object is too large to fit into the imaging range of the camera or when the shape of the projection target is complicated and has a blind portion for the camera, it is not achievable to correctly set the display area with respect to the portion which fails to show up.

SUMMARY

In view of the problems described above, an information generation method according to the present disclosure includes the steps of obtaining a first image projected from a projector, a second image obtained by imaging, from a first imaging position, a projection target in a state in which the first image is projected on the projection target, and a third image obtained by imaging the projection target from a second imaging position different from the first imaging position, identifying a first correspondence relationship between a first coordinate system representing a position on a projection image projected by the projector, and a second coordinate system representing a position on a taken image taken from the first imaging position based on the first image and the second image, identifying a second correspondence relationship between the first coordinate system and a third coordinate system representing a position on a taken image taken from the second imaging position based on the first image and the third image, displaying, by a display device, the taken image of the projection target from the first imaging position, receiving an operation of designating a first display area representing an arrangement destination in the second coordinate system of a projection object projected on the projection target from the projector, and generating transformation information configured to transform the first display area designated by the operation of designating the first display area into a second display area representing an arrangement destination of the projection object in the third coordinate system based on the first correspondence relationship and the second correspondence relationship.

In view of the problems described above, an information generation system according to the present disclosure includes a display device, and at least one processor which executes obtaining a first image projected from a projector, a second image obtained by imaging, from a first imaging position, a projection target in a state in which the first image is projected on the projection target, and a third image obtained by imaging the projection target from a second imaging position different from the first imaging position, identifying a first correspondence relationship between a first coordinate system representing a position on a projection image projected by the projector, and a second coordinate system representing a position on a taken image taken from the first imaging position based on the first image and the second image, identifying a second correspondence relationship between the first coordinate system and a third coordinate system representing a position on a taken image taken from the second imaging position based on the first image and the third image, making the display device display the taken image of the projection target from the first imaging position, receiving an operation which designates a first display area representing an arrangement destination in the second coordinate system of a projection object projected on the projection target from the projector, and generating transformation information configured to transform the first display area designated by the operation of designating the first display area into a second display area representing an arrangement destination of the projection object in the third coordinate system based on the first correspondence relationship and the second correspondence relationship.

In view of the problems described above, a non-transitory computer-readable storage medium according to the present disclosure stores a program for making a computer execute a method including the steps of obtaining a first image projected from a projector, a second image obtained by imaging, from a first imaging position, a projection target in a state in which the first image is projected on the projection target, and a third image obtained by imaging the projection target from a second imaging position different from the first imaging position, identifying a first correspondence relationship between a first coordinate system representing a position on a projection image projected by the projector, and a second coordinate system representing a position on a taken image taken from the first imaging position based on the first image and the second image, identifying a second correspondence relationship between the first coordinate system and a third coordinate system representing a position on a taken image taken from the second imaging position based on the first image and the third image, making a display device display the taken image of the projection target from the first imaging position, receiving an operation which designates a first display area representing an arrangement destination in the second coordinate system of a projection object projected on the projection target from the projector, and generating transformation information configured to transform the first display area designated by the operation of designating the first display area into a second display area representing an arrangement destination of the projection object in the third coordinate system based on the first correspondence relationship and the second correspondence relationship.

DESCRIPTION OF AN EXEMPLARY EMBODIMENT

An embodiment of the present disclosure will hereinafter be described with reference to the drawings. The embodiment described hereinafter is provided with a variety of technically preferable limitations. However, the embodiment of the present disclosure is not limited to the aspect described below.

1. Embodiment

Figure 1:
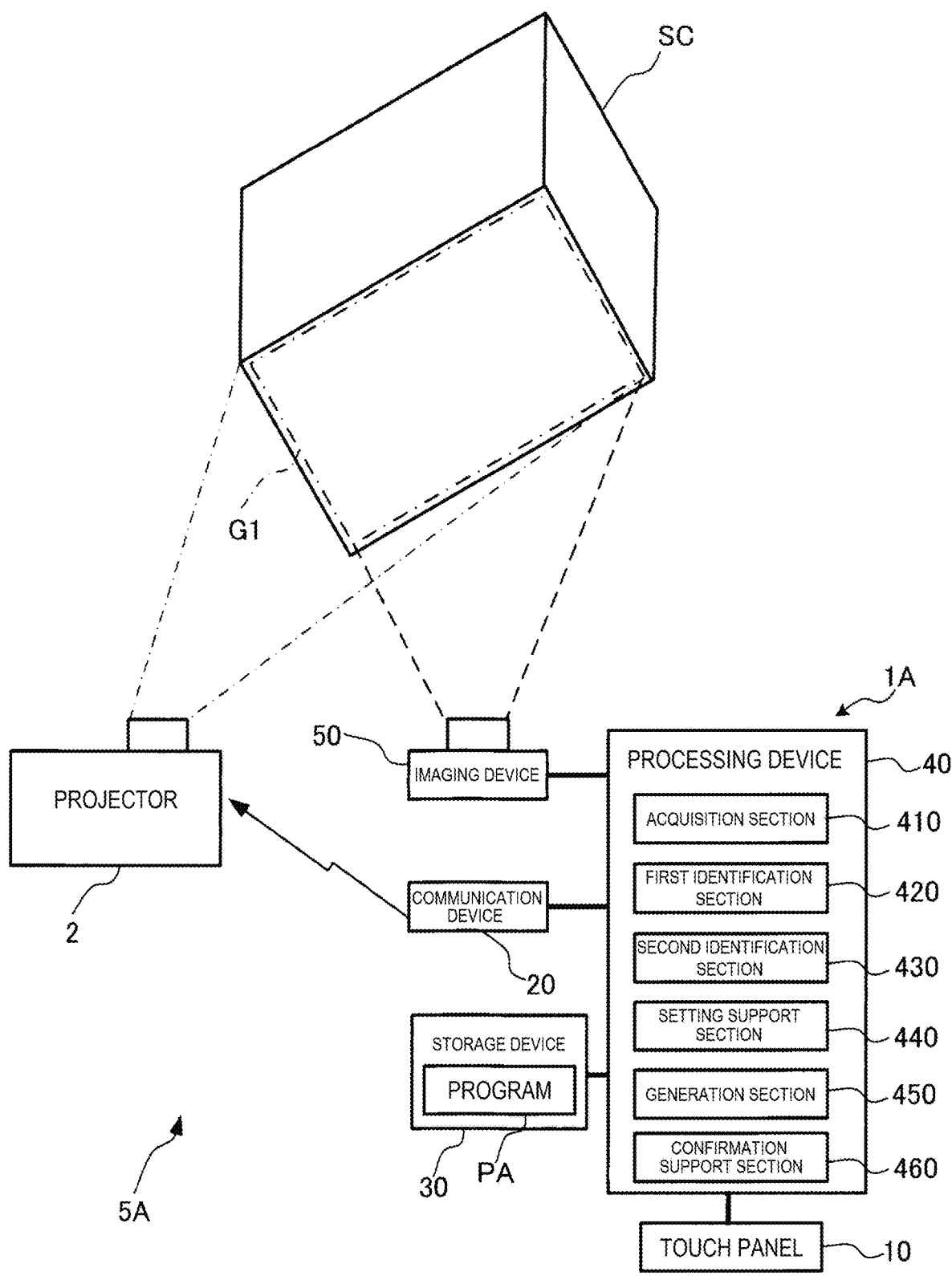
FIG. 1 is a block diagram showing a configuration example of an image display system including an information generation device for executing an information generation method according to an embodiment of the present disclosure.

FIG. 1 is a block diagram showing a configuration example of an image display system 5A including an information generation device 1A for executing an information generation method according to an embodiment of the present disclosure. In the image display system 5A, there is included a projector 2 which communicates with the information generation device 1A besides the information generation device 1A. The projector 2 projects a projection image G1 corresponding to image data supplied from the information generation device 1A on a surface of a projection target SC. In FIG. 1, although the detailed illustration is omitted, the projector 2 is provided with a light source, three display panels as a light modulation device, a projection lens, and a display panel drive section. The three display panels respectively correspond to colors of red, green, and blue. In the present embodiment, the display panels are each a liquid crystal light valve. The display panel drive section controls the transmittance of the light in each of the three display panels described above in accordance with the image data supplied from the information generation device 1A. The projector 2 modulates the light emitted from the light source with the three display panels to form image light, and then projects the image light from the projection lens to thereby display the projection image on the surface of the projection target SC. The projection target SC in the present embodiment is a rectangular solid body as shown in FIG. 1, but can have a three-dimensional shape constituted by polygons coupled to each other such as a triangular pyramidal shape or a quadrangular pyramidal shape, or a three-dimensional shape having a curved surface.

The information generation device 1A is, for example, a smartphone. The information generation device 1A has an imaging function, and a communication function of communicating with the projector 2. The information generation device 1A is not limited to the smartphone, but can also be, for example, a tablet terminal having the communication function and the imaging function. When the information generation device 1A and the projector 2 are network-connected to each other, the information generation device 1A communicates with the projector 2 to obtain projector information from the projector 2. In the projector information, there are included resolution information and compression format information representing a compression format which the projector 2 is capable of decompressing. The resolution information is information representing resolution of the display panels in the projector 2. The resolution information is used by the information generation device 1A when generating a measurement pattern for measuring a position of the projection image to be projected on the projection target SC by the projector 2. Although the detail will be described later, in the present embodiment, a binary code pattern is used as the measurement pattern. The compression format information is used for the determination of the compression format of measurement pattern data when compressing the measurement pattern data representing the measurement pattern to transmit the result from the information generation device 1A to the projector 2. It is desirable for the compression format used when compressing the measurement pattern data to transmit the result from the information generation device 1A to the projector 2 to be a lossless compression format such as run-length, LZH, PNG, or GIF.

The information generation device 1A generates the measurement pattern data representing each of the plurality of measurement patterns using the resolution information obtained from the projector 2, and then provides the measurement pattern data thus generated to the projector 2. The projector 2 projects respective images of the plurality of measurement patterns represented by the measurement pattern data provided from the information generation device 1A on the projection target SC. It should be noted that it is possible for the projector 2 to generate the measurement pattern data based on a command which is transmitted from the information generation device 1A to the projector 2, and in this case, there is no need to include the compression format information in the projector information. According to the aspect in which the measurement pattern data is generated in the projector 2, the communication time for transmitting the measurement patterns from the information generation device 1A to the projector 2 is reduced. The information generation device 1A prompts the user to take an image of the projection target SC in the state in which the image of the measurement pattern is projected thereon for each of the measurement patterns from a first imaging position and a second imaging position different from the first imaging position. The user first takes an image of the projection target SC in the state in which the image of the measurement pattern is projected thereon for each of the measurement patterns from the first imaging position using the imaging function of the information generation device 1A. Subsequently, the user moves from the first imaging position to the second imaging position with the information generation device 1A, and then takes an image of the projection target SC in the state in which the image of the measurement pattern is projected thereon for each of the measurement patterns from the second imaging position using the imaging function of the information generation device 1A.

Figure 2:
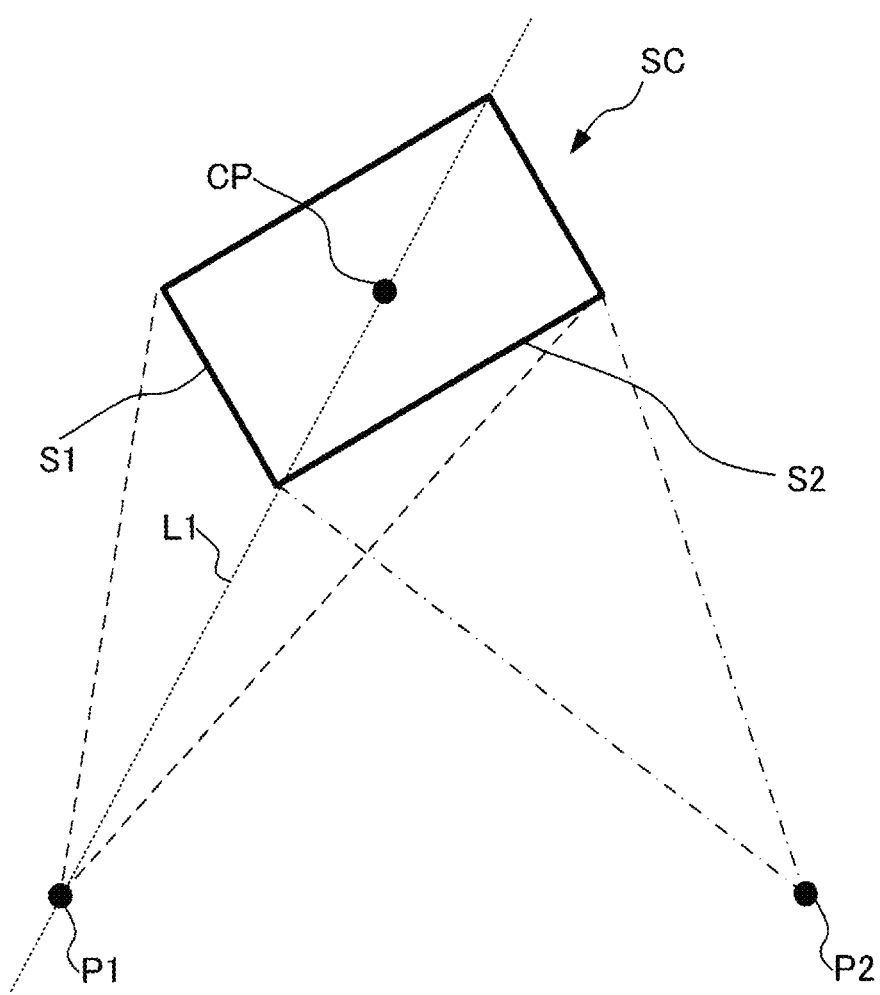
FIG. 2 is a diagram showing an example of a positional relationship between a first imaging position, a second imaging position, and a projection target in the embodiment.

FIG. 2 is a diagram showing an example of a positional relationship between the first imaging position P1, the second imaging position P2, and the projection target SC in the present embodiment. FIG. 2 is an overhead view looking down a space in which the projection target SC is installed. As shown in FIG. 2, in the present embodiment, the second imaging position P2 is a position different from a position on a straight line L1 passing through the first imaging position P1 and a centroid CP of the projection target SC. The dotted lines in FIG. 2 represent an imaging range of the information generation device 1A when taking an image of the projection target SC from the first imaging position P1. Further, the dashed-dotted lines in FIG. 2 represent an imaging range of the information generation device 1A when taking an image of the projection target SC from the second imaging position P2. As is obvious when referring to FIG. 2, a surface S1 and a surface S2 of the projection target SC show up in the taken image from the first imaging position P1. In contrast, only the surface S2 of the projection target SC shows up in the taken image from the second imaging position P2.

The information generation device 1A identifies the correspondence relationship between a projector coordinate system and a camera coordinate system based on the taken image of the projection target SC in the state in which the image of the measurement pattern is projected thereon, and the image of the measurement pattern. The projector coordinate system means a coordinate system representing a position on the projection image by the projector 2. As an example of the projector coordinate system, there can be cited a two-dimensional coordinate system taking an upper left corner of the projection image as an origin. The camera coordinate system means a coordinate system representing a position on the taken image. As a specific example of the camera coordinate system, there can be cited a two-dimensional coordinate system taking an upper left corner of the taken image as an origin. As the camera coordinate system in the present embodiment, there are two types, namely a first camera coordinate system which is a coordinate system in the taken image of the projection target SC from the first imaging position, and a second camera coordinate system which is a coordinate system in the taken image of the projection target SC from the second imaging position. The information generation device 1A identifies a first correspondence relationship as a correspondence relationship between the projector coordinate system and the first camera coordinate system, and a second correspondence relationship as a correspondence relationship between the projector coordinate system and the second camera coordinate system.

Identifying the correspondence relationship between the projector coordinate system and the camera coordinate system means generating a transformation matrix for projective transformation from one coordinate system to the other coordinate system. In the present embodiment, the information generation device 1A generates a first transformation matrix representing the first correspondence relationship, and a second transformation matrix representing the second correspondence relationship. In the present embodiment, by using the first correspondence relationship and the second correspondence relationship, it becomes possible to transform a display area of the projection object designated in the first camera coordinate system into a display area in the second camera coordinate system.

As shown in FIG. 1, the information generation device 1A includes a touch panel 10, a communication device 20, a storage device 30, a processing device 40, and an imaging device 50. The communication device 20 is a wireless communication module or a wired communication module. When the communication device 20 is the wired communication module, the communication device 20 is connected to the projector 2 via a communication line. The connection between the information generation device 1A and the projector 2 can be a direct connection without intervention of a relay device such as a wireless access point device or a router, or can also be an indirect connection via the relay device. When the communication device 20 is the wireless communication module, an ad-hoc connection can be cited as a specific example of the direct connection, and an access-point connection via a wireless access point device can be cited as a specific example of the indirect connection. Further, when the communication device 20 is the wired communication module, a peer-to-peer connection can be cited as a specific example of the direct connection, and a connection via a wired router or a wired hub can be cited as a specific example of the indirect connection. The communication device 20 communicates with the projector 2 under the control by the processing device 40. The imaging device 50 is a camera. The imaging device 50 takes an image under the control by the processing device 40, and supplies image data representing the taken image to the processing device 40.

The touch panel 10 is a device in which a display device for displaying an image and an input device to which information by a user is input are integrated with each other. The input device is, for example, a contact sensor like a transparent sheet. The input device is disposed so as to cover a display surface of the display device. The input device detects a touch position using a capacitance identified by an object which makes contact with the input device and the input device, and then outputs data representing the touch position thus detected to the processing device 40. Thus, the operation content of the user to the touch panel 10 is transmitted to the processing device 40.

The storage device 30 is a recording medium which can be read by the processing device 40. The storage device 30 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

In the nonvolatile memory of the storage device 30, there is stored a program PA to be executed by the processing device 40. The volatile memory in storage device 30 is used by the processing device 40 as a work area when executing the program PA. The program PA can be referred to as an "application program," "application software," or an "app." The program PA is obtained from, for example, a server not shown via the communication device 20, and is then stored in the storage device 30. The program PA can be stored in advance in the storage device 30.

The processing device 40 is configured including a processor such as a CPU (Central Processing Unit). The processing device 40 can be formed of a single processor, or can also be formed of a plurality of processors. Taking the fact that the operation instructing the start of the execution of the program PA is made on the touch panel 10 as a trigger, the processing device 40 retrieves the program PA from the nonvolatile memory to the volatile memory, and then starts the execution of the program PA. The processing device 40 which is currently operating in accordance with the program PA functions as an acquisition section 410, a first identification section 420, a second identification section 430, a setting support section 440, a generation section 450, and a confirmation support section 460 shown in FIG. 1. The acquisition section 410, the first identification section 420, the second identification section 430, the setting support section 440, the generation section 450, and the confirmation support section 460 shown in FIG. 1 are each a software module realized by making the processing section 40 operate in accordance with the program PA.

The acquisition section 410 obtains a first image, a second image, and a third image described below. The first image means an image of the measurement pattern projected from the projector 2. The second image means an image obtained by imaging the projection target SC from the first imaging position P1 with the imaging device 50, wherein the projection target SC is in the state in which the image of the measurement pattern is projected thereon. The third image means an image obtained by imaging the projection target SC from the second imaging position P2 with the imaging device 50, wherein the projection target SC is in the state in which the image of the measurement pattern is projected thereon.

In the more detailed description, the acquisition section 410 first obtains the projector information taking the fact that the start of the identification is instructed by an operation to the touch panel 10 under the situation in which the information generation device 1A and the projector 2 are network-connected to each other as a trigger. Subsequently, the acquisition section 410 generates the measurement pattern data from the resolution information included in the projector information. As described above, in the present embodiment, the binary code pattern is used as the measurement pattern. The binary code pattern means an image for expressing the coordinate of the display device using a binary code. The binary code is a technique of expressing a value of each of the digits when expressing an arbitrary numerical value with a binary number using ON/OFF of a switch. When using the binary code pattern as the measurement pattern, an image to be projected by the projector 2 corresponds to the switch described above, and a corresponding number of images to the number of digits of the binary number representing the coordinate value become necessary. Further, separate images are required respectively for the X coordinate and the Y coordinate. For example, when the resolution of the display panels of the projector 2 is 120×90, since 120 and 90 are each expressed by a binary number in seven digits, seven images become necessary for expressing the X coordinate, and seven images become necessary for expressing the Y coordinate.

Figure 3:
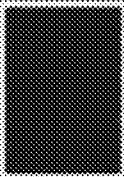
FIG. 3 is a diagram showing an example of measurement patterns in the embodiment.

Further, it is generally known that when using the binary code pattern as the measurement pattern, the robustness of the measurement deteriorates due to an influence of a disturbance light such as illumination. Therefore, when using the binary code pattern as the measurement pattern, it is common to additionally use a complementary pattern in order to suppress the influence of the disturbance light to increase the robustness of the measurement. The complementary pattern means an image obtained by flipping white and black. Hereinafter, the binary code pattern in which 1 is represented by white and 0 is represented by black is called a "positive pattern," and the complementary pattern in which the relationship is flipped is called a "negative pattern." When the resolution represented by the resolution information is 120×90, as shown in FIG. 3, the measurement pattern data representing 14 positive patterns and 14 negative patterns, measurement patterns in total, is generated by the acquisition section 410. Although the binary code patterns are used as the measurement patterns in the present embodiment, there can be used other structured light such as dot patterns, rectangular patterns, polygonal patterns, checker patterns, gray code patterns, phase-shift patterns, or random dot patterns.

The acquisition section 410 controls the projector 2 so as to sequentially project the plurality of measurement patterns represented by the measurement pattern data. Further, the acquisition section 410 prompts the user to take an image of each of the plurality of measurement patterns sequentially projected on the projection target SC from the first imaging position P1 and the second imaging position P2 with the same magnification ratio, and makes the imaging device 50 perform imaging in accordance with an operation of the user. The second image and the third image in the present embodiment are images obtained by imaging the projection target SC with the same magnification ratio with the same camera.

The first identification section 420 identifies the correspondence relationship between the projector coordinate system and the first camera coordinate system, namely the first correspondence relationship, based on the first images and the second images. The projector coordinate system is an example of a first coordinate system in the present disclosure. The first camera coordinate system is an example of a second coordinate system in the present disclosure. In the more detailed description, the first identification section 420 generates the first transformation matrix for performing the projective transformation of the coordinates of the measurement pattern in the second image into the coordinates of the measurement pattern in the display panels of the projector 2 based on the plurality of first images and the plurality of second images.

The second identification section 430 identifies the correspondence relationship between the projector coordinate system and the second camera coordinate system, namely the second correspondence relationship, based on the first images and the third images. The second camera coordinate system is an example of a third coordinate system in the present disclosure. In the more detailed description, the second identification section 430 generates the second transformation matrix for performing the projective transformation of the coordinates of the measurement pattern in the third image into the coordinates of the measurement pattern in the display panels of the projector 2 based on the plurality of first images and the plurality of third images.

The setting support section 440 makes the display device of the touch panel 10 display the taken image of the projection target SC from the first imaging position P1. This is for prompting the user to designate the first display area to be the arrangement destination in the first camera coordinate system of the projection object to be projected on the projection target SC from the projector 2. Regarding the taken image, it is possible to divert any of the plurality of second images taken when identifying the first correspondence relationship. As a specific example of the operation of designating the first display area, there can be cited an operation of sequentially designating the vertexes of the first display area so as to draw an outline of the first display area using taps or the like to the touch panel 10. For example, when designating the first display area having a rectangular shape, it is sufficient to tap vertexes of the rectangular shape in the order of a vertex on an upper left corner, a vertex on an upper right corner, a vertex on a lower right corner, and a vertex on a lower left corner. As another specific example of the operation of designating the first display area, there can be cited an operation of swiping the touch panel 10 so as to draw the outline of the first display area.

Figure 4:
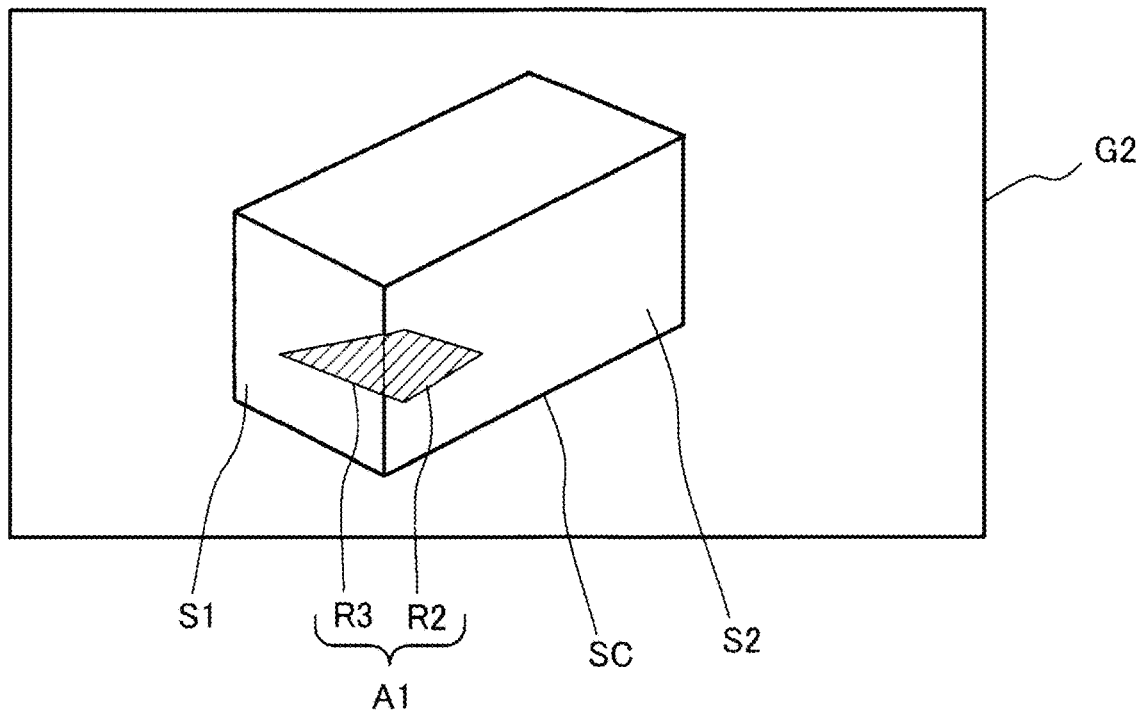
FIG. 4 is a diagram showing an example of an image which a processing device of the information generation device makes a display device display in order to prompt setting of a first display area, and a setting example of the first display area.

FIG. 4 is a diagram showing an example of an image G2 which the setting support section 440 makes the display device display in order to prompt the user to designate the first display area. An area provided with diagonal-line hatching in FIG. 4 is an example of the first display area A1 set by the operation of the user. In the example shown in FIG. 4, there is set the first display area A1 straddling the surface S1 and the surface S2 of the projection target SC. The setting support section 440 generates first vertex information representing positions of the vertexes of the first display area A1 and an order in which the vertexes are connected in accordance with the operation of designating the first display area. As a specific example of the first vertex information, there can be cited information in which information representing coordinates of the vertexes in the first camera coordinate system, namely the second coordinate system, and information representing the order of connecting the vertexes are associated with each other and are arranged. As a specific example of the information representing the order of connecting the vertexes, there can be cited IDs having values increasing in the order of the touches of the vertexes.

Based on the first correspondence relationship and the second correspondence relationship, the generation section 450 generates transformation information for transforming the first display area designated by the user into a second display area to be the arrangement destination of the projection object in the third coordinate system. The transformation information includes first transformation information for transforming the first display area into a first area in the first coordinate system based on the first correspondence relationship, and second transformation information for transforming the first area into the second display area based on the second correspondence relationship. As a specific example of the first transformation information, there can be cited the first trans formation matrix representing the first correspondence relationship. As a specific example of the second transformation information, there can be cited the second transformation matrix representing the second correspondence relationship. Further, as a specific example of the transformation information described above, there can be cited a product of the first transformation matrix and the second transformation matrix.

Figure 5:
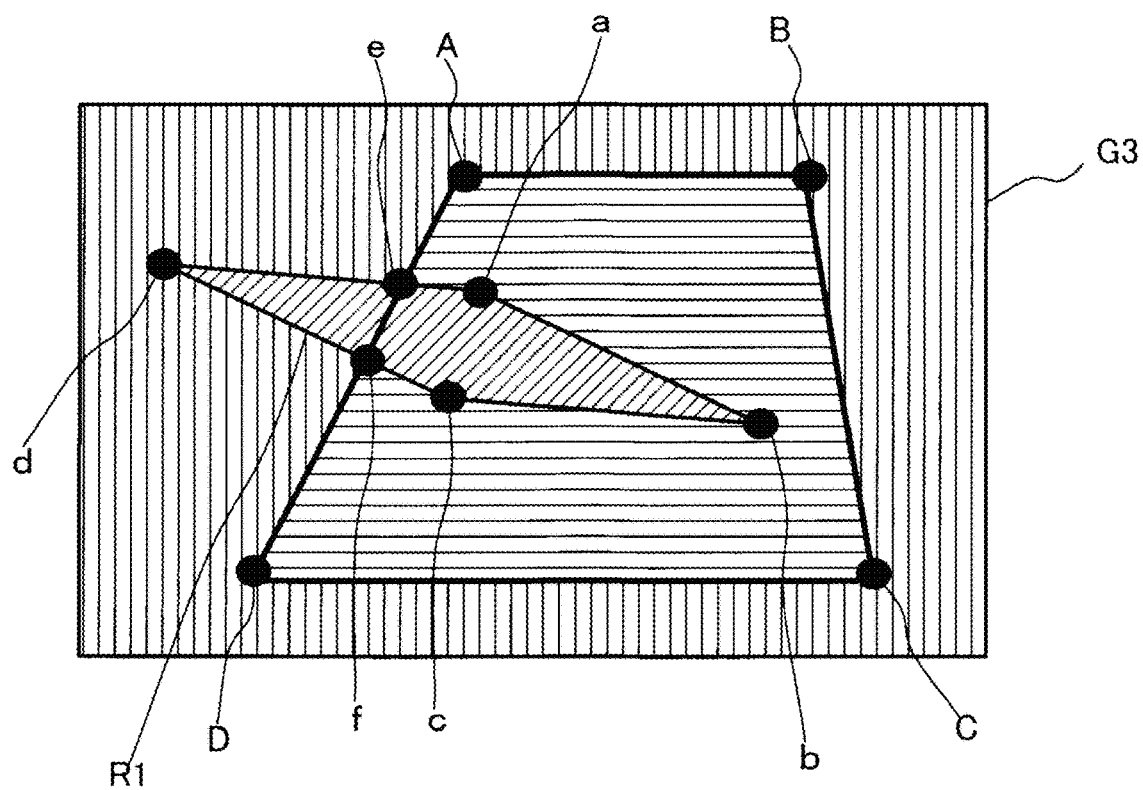
FIG. 5 is a diagram showing an example of a first area which can be obtained by transforming the first display area.

FIG. 5 is a diagram showing an example of the projection image G3 to be projected on the projection target SC from the projector 2, and the first area R1 obtained by transforming the first display area A1 based on the first correspondence relationship. Since the projection target SC in the present embodiment has a three-dimensional shape, a portion of the projection target SC which shows up in the first taken image from the first imaging position P1 partially fails to show up in the second taken image from the second imaging position P2 in some cases. Specifically, the surface S1 of the projection target SC does not show up in the second taken image. It is assumed that in such a situation, the first display area A1 straddling the surface S1 and the surface S2 is set as shown in FIG. 4. In this case, as shown in FIG. 4, the first display area A1 is sectioned into a second area R2 corresponding to a portion which shows up in both of the first taken image and the second taken image, and a third area R3 corresponding to a portion which shows up in the first taken image on the one hand, but does not show up in the second taken image described above on the other hand. A portion which is made to correspond to the second area based on the first correspondence relationship out of the first area R1 can be transformed into a fourth area in the second camera coordinate system based on the second correspondence relationship. In contrast, a portion which is made to correspond to the third area based on the first correspondence relationship out of the first area does not have the second correspondence relationship, and therefore, cannot be transformed into an area in the second camera coordinate system using the second correspondence relationship. The generation section 450 transforms the portion made to correspond to the third area into a fifth area in the second camera coordinate system based on the fourth area. In other words, in the present embodiment, the generation section 450 generates the second transformation information of transforming the second display area separately into the fourth area and the fifth area.

For example, in the projection image G3 shown in FIG. 5, a quadrangular area having vertexes A, B, C, and D corresponds to the surface S2 of the projection target SC, and regarding this area, the second correspondence relationship has already been identified. In FIG. 5, a quadrangle having vertexes a, b, c, and d corresponds to the first area R1. A pentagonal area having the vertexes a, b, c, f, and e is an area to be made to correspond to the second area R2 based on the first correspondence relationship. A triangular area having the vertexes d, e, and f is an area to be made to correspond to the third area R3 based on the first correspondence relationship. It should be noted that the vertex e is an intersection point of the line segment DA and the line segment da, and the vertex f is an intersection point of the line segment DA and the line segment cd.

The generation section 450 calculates the coordinates in the second camera coordinate system of the vertexes a, b, and c out of the four vertexes of the first area using the second transformation matrix. Subsequently, the generation section 450 obtains the line segments DA, da, and cd in the projector coordinate system to calculate the coordinates in the projector coordinate system of the vertex e and the vertex f. Subsequently, the generation section 450 obtains the coordinates in the second camera coordinate system of the vertex e and the vertex f using the second transformation matrix, and then obtains a first straight line passing through the point a and the point e and a second straight line passing through the point c and the point f in the second camera coordinate system. Then, the generation section 450 obtains an intersection point of the first straight line and the second straight line in the second camera coordinate system, and sets the coordinate of the intersection point as the coordinate of the vertex d in the second camera coordinate system. The generation section 450 generates a set of a table and the second transformation matrix as the second transformation information described above, wherein the table makes the coordinate in the projector coordinate system of the vertex d and the coordinate in the second camera coordinate system of the vertex d correspond to each other.

Figure 6:
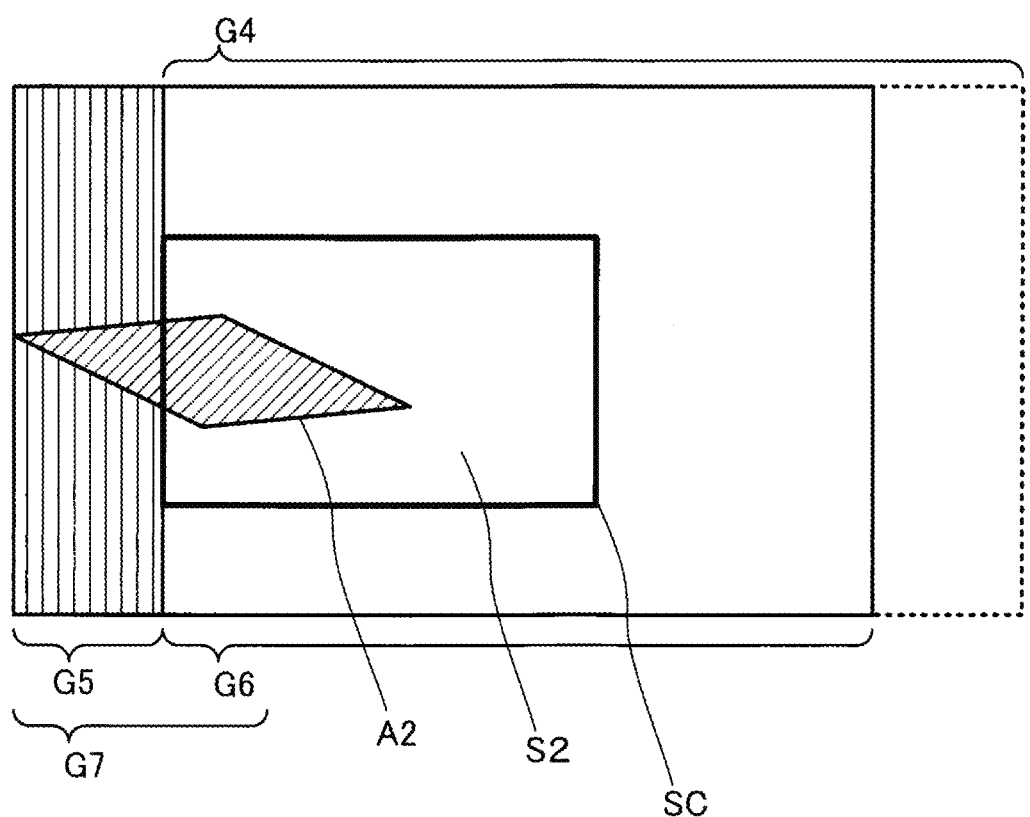
FIG. 6 is a diagram showing an example of an image which the processing device makes the display device display in order to make the user confirm a second display area.

As shown in FIG. 6, the confirmation support section 460 makes the display device display the image of the second display area A2 so as to be superimposed on an image G7 consisting of an image G5 as a margin corresponding to the coordinate of the vertex d, and an image G6 clipped from the taken image G4 of the projection target SC from the second imaging position P2 so as to be narrowed as much as the margin. On this occasion, the confirmation support section 460 makes the display device display the inside of the outline of the second display area filled with a first color, and the outline of the second display area with a second color. As a specific example of the first color, there can be cited a red color, and as a specific example of the second color, there can be cited a blue color. It should be noted that the outline of the second display area is drawn with the second color in the present embodiment, but can be drawn with the first color. Further, the inside of the outline of the second display area is filled with the first color in the present embodiment, but filling with the first color can be omitted. Further, it is possible to omit the drawing of the outline of the second display area to express the second display area only by drawing of the vertexes represented by second vertex information.

Figure 7:
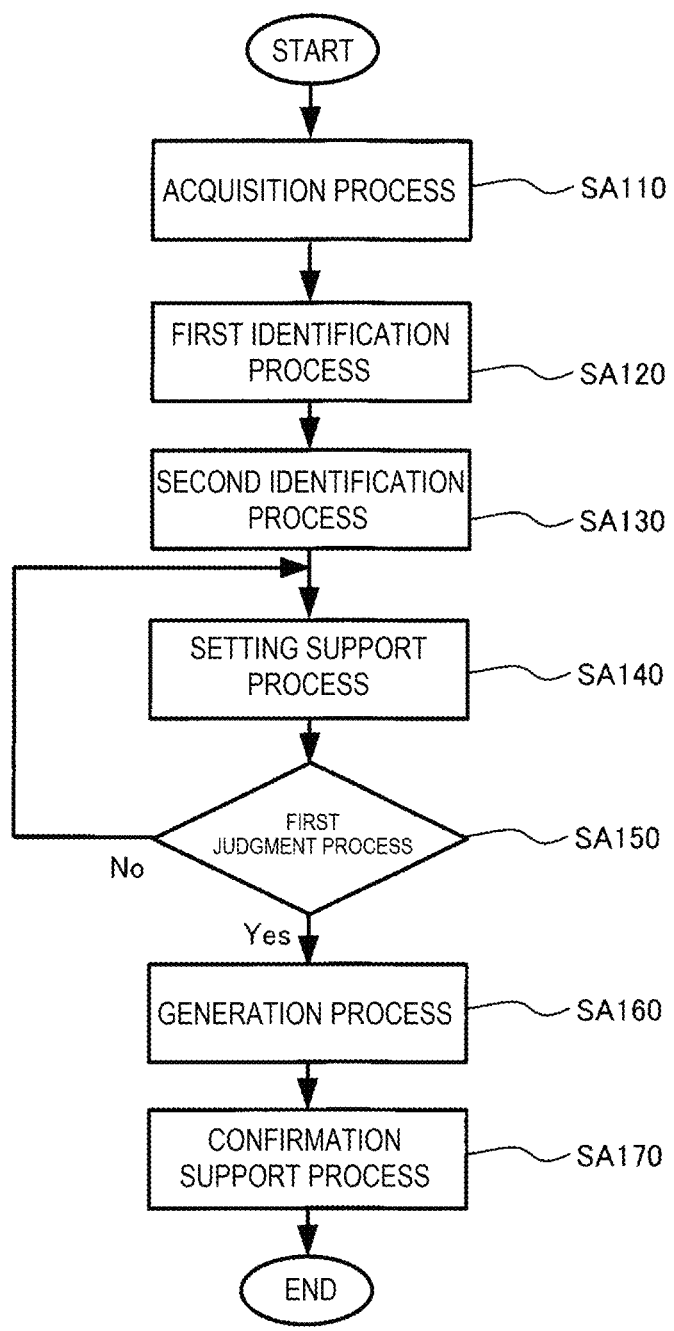
FIG. 7 is a flowchart showing a flow of an information generation method to be executed by the processing device in accordance with a program.

Further, the processing device 40 which is operating in accordance with the program PA executes an information generation method according to the present disclosure. FIG. 7 is a diagram showing a flow of the information generation method to be executed by the processing device 40 in accordance with the program PA. As shown in FIG. 7, the information generation method according to the present disclosure includes an acquisition process SA110, a first identification process SA120, a second identification process SA130, a setting support process SA140, a first judgment process SA150, a generation process SA160, and a confirmation support process SA170.

In the acquisition process SA110, the processing device 40 functions as the acquisition section 410. In the acquisition process SA110, taking the fact that the start of the identification is instructed by the user using the operation to the touch panel 10 as a trigger, the processing device 40 requests transmission of the projector information to the projector 2, and obtains the projector information sent back from the projector 2. Then, the processing device 40 generates the plurality of measurement patterns based on the resolution information included in the projector information obtained from the projector 2. The processing device 40 controls the projector 2 so as to sequentially project the plurality of measurement patterns represented by the measurement pattern data. Further, the processing device 40 prompts the user to take an image of each of the plurality of measurement patterns sequentially projected on the projection target SC from the first imaging position P1 and the second imaging position P2, and makes the imaging device 50 perform imaging in accordance with an operation of the user to obtain the second images and the third images.

In the first identification process SA120 following the acquisition process SA110, the processing device 40 functions as the first identification section 420. In the first identification process SA120, the processing device 40 identifies the first correspondence relationship. In other words, in the first identification process SA120, the processing device 40 generates the first transformation matrix. In the second identification process SA130 following the first identification process SA120, the processing device 40 functions as the second identification section 430. In the second identification process SA130, the processing device 40 identifies the second correspondence relationship. In other words, in the second identification process SA130, the processing device 40 generates the second transformation matrix.

In the setting support process SA140 following the second identification process SA130, the processing device 40 functions as the setting support section 440. In the setting support process SA140, the processing device 40 makes the display device of the touch panel 10 display the taken image of the projection target SC from the first imaging position P1 to thereby prompt the user to designate the first display area to be the arrangement destination in the first camera coordinate system of the projection object to be projected on the projection target SC from the projector 2. It should be noted that when disposing the plurality of projection objects in the projection image, it is sufficient to repeat the setting support process SA140 and the subsequent processes the same number of times as the number of the projection objects to be disposed in the projection image. When the operation of designating the first display area is performed on the touch panel 10, the processing device 40 generates the first vertex information described above. When setting of the first display area is completed, the user instructs completion of the setting of the first display area to the information generation device 1A using an operation to the touch panel 10.

In the first judgment process SA150, the processing device 40 judges whether or not the completion of the setting of the first display area is instructed using the operation to the touch panel 10. When the judgment result in the first judgment process SA150 is "No," the processing device 40 executes the setting support process SA140 once again. When the judgment result in the first judgment process SA150 is "Yes," the processing device 40 executes the generation process SA160. In the generation process SA160, the processing device 40 functions as the generation section 450. In the generation process SA160, the processing device 40 generates the transformation information for transforming the first vertex information generated in the setting support process SA140 into the second vertex information.

In the confirmation support process SA170, the processing device 40 functions as the confirmation support section 460. In the confirmation support process SA170, the processing device 40 makes the display device of the touch panel 10 display the image of the second display area so as to be superimposed on the taken image from the second imaging position, wherein in the image of the second display area, the inside of the outline is filled with the first color and the outline is drawn with the second color.

According to the information generation device 1A related to the present embodiment, it becomes possible to transform the display area designated on the taken image of the projection target SC from the first imaging position P1 into the display area on the taken image of the projection target from the second imaging position P2. Although in the taken image from the first imaging position P1, the surface S1 and the surface S2 to be the arrangement destination of the display area show up, the distortion of the shapes of the surface S1 and the surface S2 in the taken image is high. In contrast, although in the taken image from the second imaging position P2, only the surface S2 shows up, the distortion of the shape of the surface S2 in the taken image is low. According to the present embodiment, it becomes possible to transform the display area set with reference to the taken image accompanied by the high distortion into the display area on the taken image low in distortion, and then make the user confirm the display area. In addition, according to the present embodiment, it becomes possible to set the display area to the taken image from the first imaging position so as to include the range which does not show up in the taken image from the second imaging position P2. As described above, according to the information generation device 1A related to the present embodiment, it becomes possible to set the display area to be the arrangement destination of the projection object regardless of the shape of the projection target SC. Further, according to the present embodiment, it becomes possible to make the user figure out the display area in the second camera coordinate system over the colors.

2. Modified Examples

The embodiment described above can be modified as follows.

(1) In the embodiment described above, the first display area is set by the operation of designating the vertexes of the first display area in sequence so as to draw the outline of the first display area using taps or the like. However, it is possible to make the user designate the first display area using a predetermined figure such as a variety of polygons or an ellipse. For example, when displaying a pull-down menu for selecting any of a predetermined plurality of types of figures, it is sufficient to set the first display area by an operation of selecting one of the figures displayed in the pull-down menu, and an operation of changing at least one of the position and the shape of the figure thus selected. Further, it is possible to identify the overall shape of the projection target SC or the shape of each of the surfaces of the projection target SC using edge detection or the like, and include the figure corresponding to the shape thus identified in the pull-down menu described above.

(2) In the embodiment described above, when a part of the projection target SC does not show up in the taken image from the second imaging position P2, and the first display area is sectioned into the second area and the third area, the portion corresponding to the second area of the first area is transformed into the fourth area using the second transformation matrix, and the portion corresponding to the third area is transformed into the fifth area based on the fourth area. However, it is possible to omit the transformation of the portion corresponding to the third area into the fifth area, and form the second display area only with the fourth area.

Figure 8:
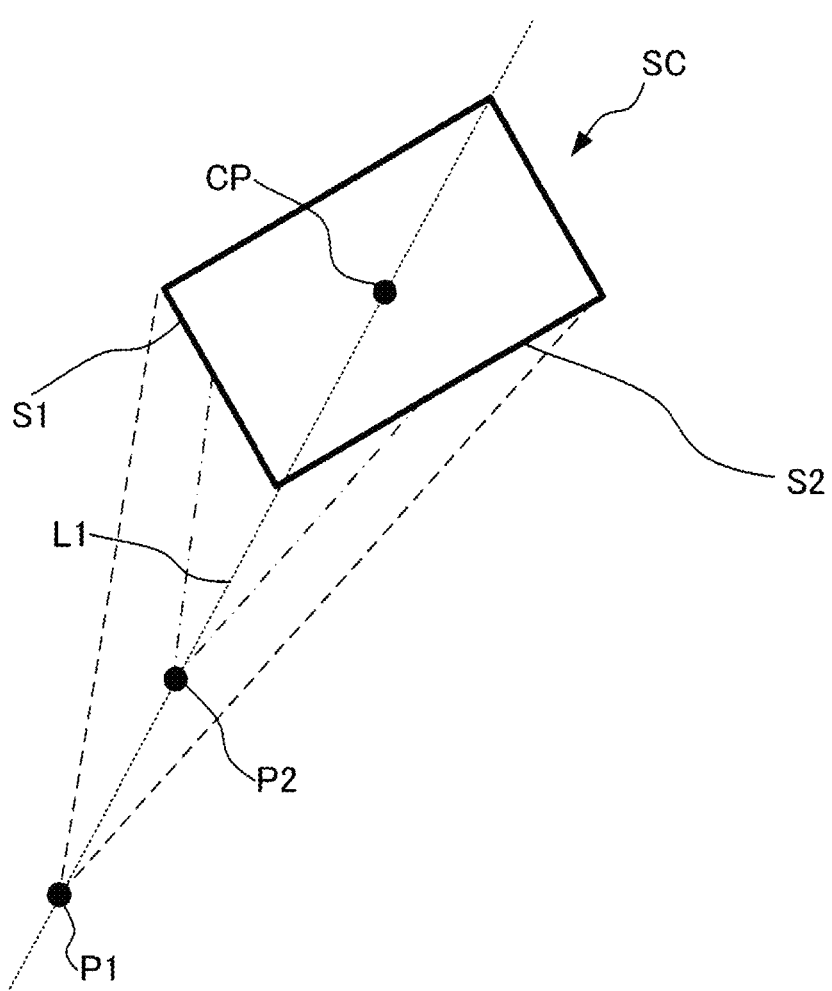
FIG. 8 is a diagram showing another example of a positional relationship between the first imaging position, the second imaging position, and a projection target.

(3) In the embodiment described above, one of the first imaging position P1 and the second imaging position P2 is a position different from a position on the straight line connecting the other of the first imaging position P1 and the second imaging position P2 and the projection target SC, and the second image and the third image are the images obtained by imaging the projection target SC with the same magnification ratio. However, the second imaging position P2 can be a position on the straight line L1 connecting the first imaging position P1 and the projection target SC as shown in FIG. 8. In this case, the magnification ratio of the projection target SC in the third image and the magnification ratio of the projection target SC in the second image can be different from each other. For example, in the example shown in FIG. 8, the magnification ratio of the projection target SC in the third image can be higher than the magnification ratio of the projection target SC in the second image. According to this aspect, it become possible for the user to set the display area corresponding to the detailed shapes of the surface S1 and the surface S2 while confirming details of the surface S1 and the surface S2 with reference to the taken image from the second imaging position P2 higher in magnification ratio, wherein the display area of the surface S1 and the surface S2 is set with reference to the taken image from the first imaging position P1.

Figure 9:
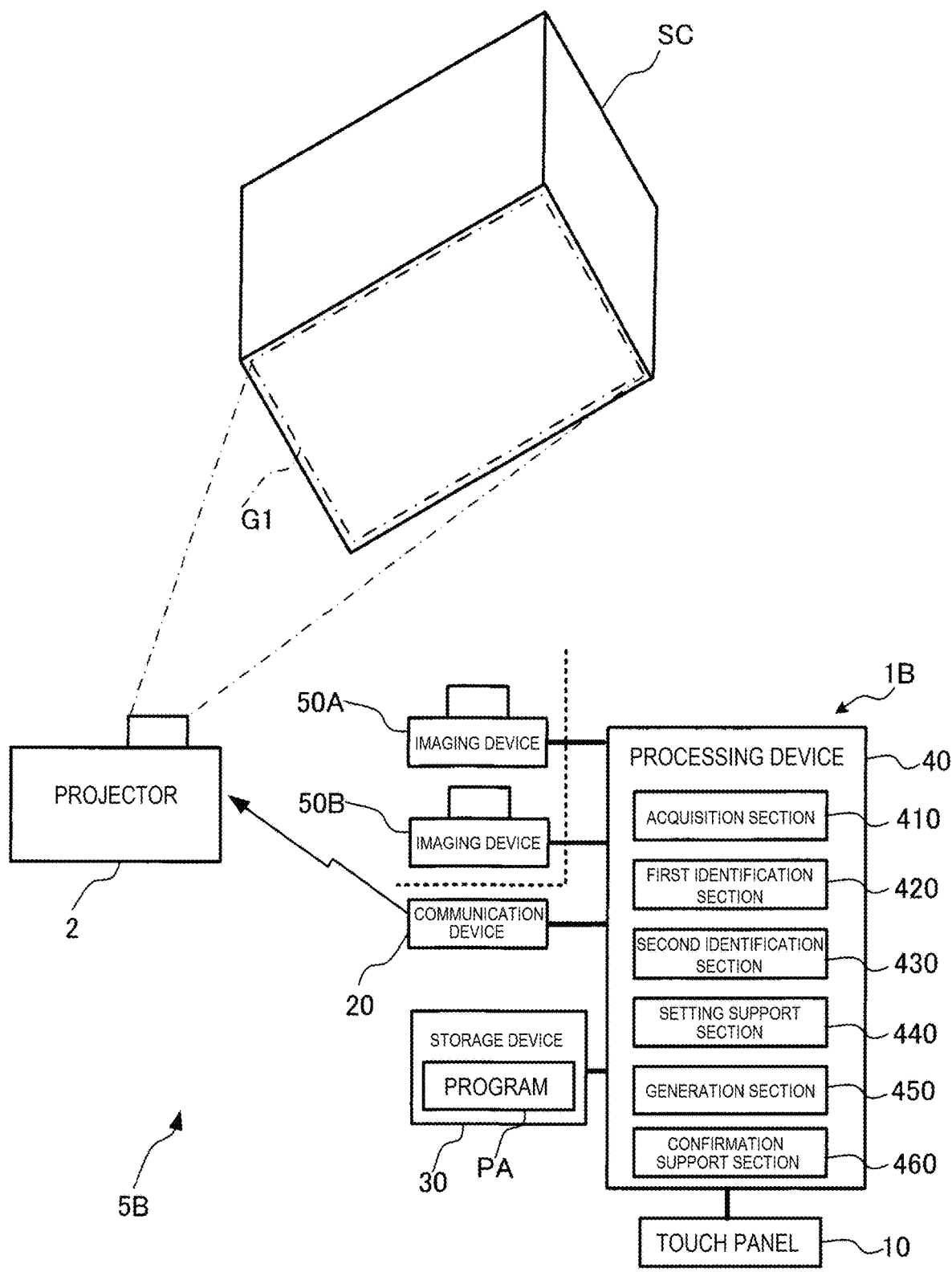
FIG. 9 is a diagram showing an example of an image display system according to Modified Example.

(4) The information generation device 1A according to the embodiment described above is the smart phone having the imaging device 50, but can be a tablet terminal provided with an imaging device, or a personal computer of a notebook type or a stationary type provided with the imaging device. When using the personal computer of the notebook type or the stationary type as the information generation device according to the present disclosure, it is possible to receive the designation of the first display area using a mouse or a keyboard as the input device. Further, when the information generation device can obtain the taken image using data communication via a network such as LAN, the information generation device is not required to be provided with the imaging device. In this case, for example, as shown in FIG. 9, it is possible to constitute an image display system 5B by coupling an imaging device 50A to be installed at the first imaging position P1 and an imaging device 50B installed at the second imaging position P2 to an information generation device 1B having the touch panel 10, the communication device 20, and the processing device 40. In the image display system 5B shown in FIG. 9, it is possible to concurrently take the second image and the third image. Therefore, in the image display system 5B shown in FIG. 9, the user is not required to move from the first imaging position P1 to the second imaging position P2 with the information generation device 1B. Further, in a computer system having a portable terminal such as a smartphone or a tablet terminal and a server device communicating therewith via a LAN or the Internet, it is possible to make a processing device of the server device function as the acquisition section 410, the first identification section 420, the second identification section 430, the setting support section 440, and the generation section 450, and make the portable terminal play a role of the display device and the input device. The computer system is an example of the information generation system according to the present disclosure.

(5) The acquisition section 410, the first identification section 420, the second identification section 430, the setting support section 440, the generation section 450, and the confirmation support section 460 are each a software module. However, some or all of the acquisition section 410, the first identification section 420, the second identification section 430, the setting support section 440, the generation section 450, and the confirmation support section 460 can be hardware. As an example of the hardware, there can be cited a DSP (Digital Signal Processor), an ASIC (Application Specific Integrated Circuit), a PLD (Programmable Logic Device), and an FPGA (Field Programmable Gate Array). Even when some or all of the acquisition section 410, the first identification section 420, the second identification section 430, the setting support section 440, the generation section 450, and the confirmation support section 460 are hardware, the same advantages as those of the embodiment described above are exerted.

(6) In the embodiment described above, the program PA has already been stored in the storage device 30. However, it is possible to manufacture or distribute the program PA alone. As a specific method of distributing the program PA, there can be cited an aspect of writing the program PA described above in a computer-readable recording medium such as a flash ROM (Read Only Memory) to distribute the recording medium, and an aspect of distributing the program PA by downloading the program PA via a telecommunication line such as the Internet. By installing the program PA in a general information processing device such as a personal computer, and then operating a computer such as a CPU in the information processing device in accordance with the program, it becomes possible to make the information processing device function as the information generation device according to the present disclosure.

3. Aspects Figured Out from at Least One of Embodiment and Modified Examples The present disclosure is not limited to the embodiment and the modified examples described above, but can be implemented in a variety of aspects within the scope or the spirit of the present disclosure. For example, the present disclosure can also be implemented in the following aspects. The technical features in the embodiment described above corresponding to the technical features in each of the aspects described below can properly be replaced or combined in order to solve a part or the whole of the problem of the present disclosure, or to achieve some or all of the advantages of the present disclosure. Further, the technical feature can properly be eliminated unless described in the present specification as an essential element.

In order to solve the problems described hereinabove, an aspect of the information generation method according to the present disclosure includes the acquisition process SA110, the first identification process SA120, the second identification process SA130, the setting support process SA140, and the generation process SA160.

In the acquisition process SA110, there are obtained the image of the measurement pattern to be projected on the projection target SC from the projector 2, the taken image obtained by imaging, from the first imaging position P1, the projection target SC in the state in which the image of the measurement pattern is projected thereon, and the taken image obtained by imaging, from the second imaging position P2, the projection target SC in the state in which the image of the measurement pattern is projected thereon. The image of the measurement pattern is an example of the first image in the present disclosure. The taken image obtained by imaging, from the first imaging position P1, the projection target SC in the state in which the image of the measurement pattern is projected thereon is an example of a second image in the present disclosure. The taken image obtained by imaging, from the second imaging position P2, the projection target SC in the state in which the image of the measurement pattern is projected thereon is an example of a third image in the present disclosure.

In the first identification process SA120, the first correspondence relationship between the first coordinate system representing the position on the projection image to be projected by the projector 2 and the second coordinate system representing the position on the taken image taken from the first imaging position P1 is identified based on the first images and the second images. In the second identification process SA130, the second correspondence relationship between the first coordinate system and the third coordinate system representing the position on the taken image taken from the second imaging position P2 is identified based on the first images and the third images.

In the setting support process SA140, by making the display device of the touch panel 10 display the taken image of the projection target SC from the first imaging position P1, the user is prompted to designate the first display area A1 to be the arrangement destination in the second coordinate system of the projection object to be projected on the projection target SC from the projector 2. Further, in the generation process SA160, based on the first correspondence relationship and the second correspondence relationship, there is generated the transformation information for transforming the first display area A1 into the second display area A2 to be the arrangement destination of the projection object in the third coordinate system.

According to the information generation method related to the present aspect, it is possible to transform the first display area designated on the taken image of the projection target SC from the first imaging position P1 into the second display area on the taken image of the projection target SC from the second imaging position P2. It is assumed that, for example, one of the first imaging position P1 and the second imaging position P2 is a position on the straight line connecting the other of the first imaging position P1 and the second imaging position P2 and the projection target SC, and the second image and the third image are different in magnification ratio of the projection target SC from each other. In this case, it is possible for the user to confirm the display area to be the arrangement destination of the projection object while changing the magnification ratio.

Further, when one of the first imaging position P1 and the second imaging position P2 is a position different from a position on the straight line connecting the other of the first imaging position P1 and the second imaging position P2 and the projection target SC, and the second image and the third image are the images obtained by imaging the projection target SC with the same magnification ratio, there is generated the transformation information for confirming the display area while changing the viewing direction of the projection target. Therefore, even when there is a portion which does not show up in one of the taken images, it is possible to set the display area including the portion which does not show up there. As described above, according to the information generation method related to the present aspect, it becomes possible to set the display area to be the arrangement destination of the projection object regardless of the shape of the projection target.

In the information generation method according to a more preferable aspect, the transformation information can include the first transformation information for transforming the first display area A1 into the first area R1 in the first coordinate system based on the first correspondence relationship, and the second transformation information for transforming the first area R1 into the second display area A2 based on the second correspondence relationship.

In the information generation method according to another preferable aspect, when a part of the portion of the projection target SC which shows up in the first taken image obtained by imaging the projection target SC from the first imaging position P1 fails to show up in the second taken image obtained by imaging the projection target SC from the second imaging position P2, and the first display area A1 is sectioned into the second area R2 and the third area R3, the second transformation information described below is generated in the generation process SA160. The second area R2 corresponds to the portion which shows up in both of the first taken image and the second taken image out of the first display area A1. The third area R3 corresponds to the portion which shows up in the first taken image but does not show up in the second taken image out of the first display area A1. In this case, there is generated the second transformation information for performing the transformation into the second display area A2 so as to be separated into the fourth area and the fifth area described below. The fourth area is an area which can be obtained by transforming a portion of the first area R1 based on the second correspondence relationship, wherein the portion of the first area R1 is made to correspond to the second area R2 based on the first correspondence relationship. The fifth area is an area which can be obtained by transforming a portion of the first area based on the fourth area, wherein the portion of the first area is made to correspond to the third area R3 based on the first correspondence relationship. According to the present aspect, it becomes possible to set the first display area A1 so as to include the range which does not show up in the second taken image.

In the information generation method according to a more preferable aspect, the second image can be taken by the imaging device 50 installed at the first imaging position P1, and the third image can be taken by the imaging device 50 installed at the second imaging position P2. According to the present aspect, it is possible to take the second image and the third image with a single imaging device.

In the information generation method according to a more preferable aspect, the second image can be taken by the imaging device 50A installed at the first imaging position P1, and the third image can be taken by the imaging device 50B installed at the second imaging position P2. The imaging device 50A is an example of the first camera in the present disclosure, and the imaging device 50B is an example of the second camera in the present disclosure. According to the present aspect, it is possible to take the second image and the third image at the same time.

Further, in order to solve the problems described above, an aspect of the information generation system according to the present disclosure is provided with the display device, the input device, and the processing device 40 described below. Further, the processing device 40 executes the acquisition process SA110, the first identification process SA120, the second identification process SA130, the setting support process SA140, and the generation process SA160 described above. According also to the information generation system related to the present aspect, it becomes possible to set the display area to be the arrangement destination of the projection object regardless of the shape of the projection target.

In the information generation system according to a more preferable aspect, the processing device 40 further executes the confirmation support process SA170. In the confirmation support process SA170, the processing device 40 makes the display device display the taken image from the second imaging position P2 in the state in which the second display area A2 is filled with the first color. According to the present aspect, it is possible for the user to figure out the second display area at a glance over the colors.

In the information generation system in a further more preferable aspect, in the confirmation support process SA170, the processing device 40 makes the display device display the outline of the second display area A2 with the second color. According to the present aspect, it is possible for the user to figure out the outline of the second display area at a glance over the colors.

Further, in order to solve the problems described above, an aspect of a non-transitory computer-readable storage medium storing a program according to the present disclosure makes a computer execute the acquisition process SA110, the first identification process SA120, the second identification process SA130, the setting support process SA140, and the generation process SA160 described above. According also to the non-transitory computer-readable storage medium storing the program related to the present aspect, it becomes possible to set the display area to be the arrangement destination of the projection object regardless of the shape of the projection target.

What is claimed is:

1. An information generation method comprising:
obtaining a first image projected from a projector, a second image obtained by imaging, from a first imaging position, a projection target in a state in which the first image is projected on the projection target, and a third image obtained by imaging the projection target from a second imaging position different from the first imaging position;
identifying a first correspondence relationship between a first coordinate system representing a position on a projection image projected by the projector, and a second coordinate system representing a position on a taken image taken from the first imaging position based on the first image and the second image;
identifying a second correspondence relationship between the first coordinate system and a third coordinate system representing a position on a taken image taken from the second imaging position based on the first image and the third image;
displaying, by a display device, the taken image of the projection target from the first imaging position;
receiving an operation of designating a first display area representing an arrangement destination in the second coordinate system of a projection object projected on the projection target from the projector; and
generating transformation information configured to transform the first display area designated by the operation of designating the first display area into a second display area representing an arrangement destination of the projection object in the third coordinate system based on the first correspondence relationship and the second correspondence relationship.

2. The information generation method according to claim 1, wherein
the transformation information includes
first transformation information configured to transform the first display area into a first area in the first coordinate system based on the first correspondence relationship, and
second transformation information configured to transform the first area into the second display area based on the second correspondence relationship.

3. The information generation method according to claim 2, wherein
when a part of a portion of the projection target which shows up in a first taken image obtained by imaging the projection target from the first imaging position and fails to show up in a second taken image obtained by imaging the projection target from the second imaging position, and the first display area is sectioned into a second area corresponding to a portion which shows up in both of the first taken image and the second taken image, and a third area corresponding to a portion which shows up in the first taken image and fails to show up in the second taken image,
there is generated the second transformation information configured to perform the transformation separating the second display area into a fourth area and a fifth area, the fourth area being obtained by transforming, based on the second correspondence relationship, a portion which is made to correspond to the second area based on the first correspondence relationship out of the first area, and the fifth area being obtained by transforming, based on the fourth area, a portion which is made to correspond to the third area based on the first correspondence relationship out of the first area.

4. The information generation method according to claim 1, wherein
one of the first imaging position and the second imaging position is a position on a straight line connecting another of the first imaging position and the second imaging position and the projection target, and the second image and the third image are different in magnification ratio of the projection target from each other.

5. The information generation method according to claim 1, wherein
one of the first imaging position and the second imaging position is a position different from a position on a straight line connecting another of the first imaging position and the second imaging position and the projection target, and the second image and the third image are images obtained by imaging the projection target with a same magnification ratio.

6. The information generation method according to claim 1, wherein
the second image is taken by a camera installed at the first imaging position, and the third image is taken by the camera installed at the second imaging position.

7. The information generation method according to claim 1, wherein
the second image is taken by a first camera installed at the first imaging position, and the third image is taken by a second camera installed at the second imaging position.

8. An information generation system comprising:
a display device; and
at least one processor which executes
obtaining a first image projected from a projector, a second image obtained by imaging, from a first imaging position, a projection target in a state in which the first image is projected on the projection target, and a third image obtained by imaging the projection target from a second imaging position different from the first imaging position,
identifying a first correspondence relationship between a first coordinate system representing a position on a projection image projected by the projector, and a second coordinate system representing a position on a taken image taken from the first imaging position based on the first image and the second image,
identifying a second correspondence relationship between the first coordinate system and a third coordinate system representing a position on a taken image taken from the second imaging position based on the first image and the third image,
making the display device display the taken image of the projection target from the first imaging position,
receiving an operation which designates a first display area representing an arrangement destination in the second coordinate system of a projection object projected on the projection target from the projector, and
generating transformation information configured to transform the first display area designated by the operation of designating the first display area into a second display area representing an arrangement destination of the projection object in the third coordinate system based on the first correspondence relationship and the second correspondence relationship.

9. The information generation system according to claim 8, wherein
the processor further executes making the display device display the taken image from the second imaging position in a state in which the second display area is filled with a first color.

10. The information generation system according to claim 8, wherein
the processor makes the display device display an outline of the second display area with a second color.

11. A non-transitory computer-readable storage medium storing a program for making a computer execute a method comprising:
obtaining a first image projected from a projector, a second image obtained by imaging, from a first imaging position, a projection target in a state in which the first image is projected on the projection target, and a third image obtained by imaging the projection target from a second imaging position different from the first imaging position;
identifying a first correspondence relationship between a first coordinate system representing a position on a projection image projected by the projector, and a second coordinate system representing a position on a taken image taken from the first imaging position based on the first image and the second image;
identifying a second correspondence relationship between the first coordinate system and a third coordinate system representing a position on a taken image taken from the second imaging position based on the first image and the third image;
making a display device display the taken image of the projection target from the first imaging position;
receiving an operation which designates a first display area representing an arrangement destination in the second coordinate system of a projection object projected on the projection target from the projector; and
generating transformation information configured to transform the first display area designated by the operation of designating the first display area into a second display area representing an arrangement destination of the projection object in the third coordinate system based on the first correspondence relationship and the second correspondence relationship.

* * * * *